No. 770,789. PATENTED SEPT. 27, 1904.
A. WOOD.
MECHANICAL MOVEMENT.
APPLICATION FILED DEC. 21, 1903.
NO MODEL.

WITNESSES:
H. A. Lamb.
M. J. Snyder

INVENTOR
Andrew Wood
BY
ATTORNEY

No. 770,789. Patented September 27, 1904.

UNITED STATES PATENT OFFICE.

ANDREW WOOD, OF BRIDGEPORT, CONNECTICUT.

MECHANICAL MOVEMENT.

SPECIFICATION forming part of Letters Patent No. 770,789, dated September 27, 1904.

Application filed December 21, 1903. Serial No. 186,034. (No model.)

*To all whom it may concern:*

Be it known that I, ANDREW WOOD, a citizen of the United States, residing at Bridgeport, in the county of Fairfield and State of Connecticut, have invented certain new and useful Improvements in Mechanical Movements; and I do hereby declare the following to be a full, clear, and exact description of the invention, such as will enable others skilled in the art to which it appertains to make and use the same.

My invention relates to mechanical movements such as may be utilized in instances where it is desired to avoid the use of rock-shafts in communicating motion from eccentrics or cranks to reciprocatory elements, such as valve or piston rods.

Figure 1:
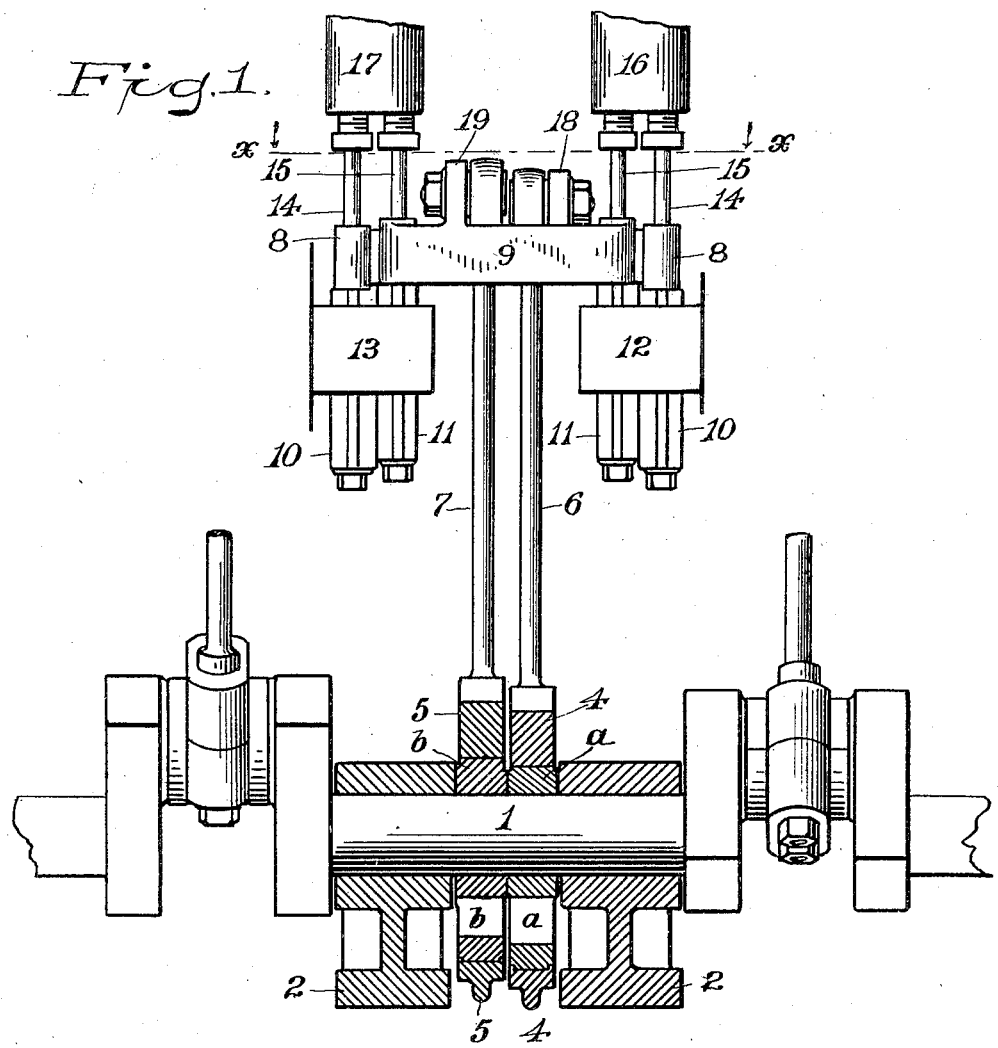
Figure 2:
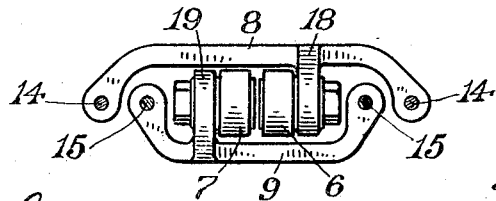

In the accompanying drawings I have illustrated my improvement as applied to a machine where motion is to be communicated from eccentrics to valve-stems, Figure 1 being an elevation, partly in section and partly broken away, showing my improvement as applied in the manner above set forth, while Fig. 2 is a section at the line $x$ $x$ of Fig. 1, but with all the parts of the construction shown removed, except the yokes and the parts immediately connected thereto.

Similar characters of reference denote like parts in both figures of the drawings.

In communicating motion from eccentrics or cranks the eccentric or crank rods are as a rule connected with rock-shafts, and the latter are in turn connected with the reciprocatory parts, such as piston or valve rods; but it becomes desirable in some instances to economize space and to transmit motion in as direct a line as possible, and accordingly I have produced a movement which will accomplish these results and which will be best understood from the following description:

1 is an ordinary power-shaft journaled in any ordinary manner in bearings 2 and carrying eccentrics $a$ $b$, around which are the usual straps 4 5, to which are connected eccentric-rods 6 7.

8 9 are yokes from which depend guide-rods 10 11, which rods are steadied and guided within stationary blocks 12 13, said rods being capable of a free reciprocation within said blocks. The yoke 8 incloses the yoke 9, as will be seen by reference to Fig. 2, and to these yokes are secured rods 14 15. In the drawings I have merely shown ordinary stuffing-boxes 16 17, into which these rods extend, and I have shown no cylinders or valve-casings, since it is not thought necessary to illustrate such parts, as they do not constitute any part of my present invention. I will merely state that these rods must of course have reciprocatory movements in order to operate the valves or pistons to which they may be attached.

The upper extremities of the eccentric-rods 6 7 are pivoted, respectively, to ears 18 19, that rise from the yokes 8 9, and it will therefore be clear that as the power-shaft revolves the yokes themselves will have reciprocatory movements, which latter will be communicated to the rods 14 15. These rods are usually in alinement, since the cylinders or valve-casings of stationary apparatus are usually in alinement, and it is also true that in steam-cylinders and valve-casings a rod is generally operated to control the supply while another rod is operated to control the cut-off, and it is advantageous in such an instance that such rods should be in alinement. I have therefore shown the yokes as contained one within the other not only for the purpose of economizing space and in order that said yokes may not interfere in their reciprocatory movements, but also in order to conveniently establish the alinement of the rods.

It will be obvious that the usual crank-rods that are connected with the power-shaft may be pivoted to the yokes, and therefore I do not wish to be limited to the use of eccentric-rods in this connection.

Having thus described my invention, what I claim as new, and desire to secure by Letters Patent, is—

1. In a device of the class described, the combination with reciprocating rods, of a yoke connected to one of said rods, a second yoke having its ends inclosed by the ends of the first yoke and arranged to move between the horizontal planes between which the first-mentioned yoke moves, said second-mentioned yoke being engaged by the other of said rods, and elements actuated by said yokes.

2. In a device of the class described, the combination with reciprocating rods, of a yoke connected to one of said rods, a second yoke having its ends inclosed by the first-mentioned yoke and arranged to move between the horizontal planes between which the first-mentioned yoke moves, said second-mentioned yoke being engaged by the other of said rods, and rods arranged in the same vertical plane and engaged by the ends of said yokes.

3. In a device of the class described, the combination of a plurality of yokes, one of the yokes inclosing the ends of the other of said yokes, an inwardly-projecting lug extending from each of said yokes, reciprocating rods pivotally engaging said lugs between the yokes, and elements to be operated connected to the ends of said yokes.

4. In a device of the class described, the combination of yokes spaced apart, a lug projecting from one of said yokes toward the other, a lug projecting from the other of said yokes toward the first-mentioned yoke, actuating-rods arranged between said yokes and engaging the said lugs for operating the yokes, and elements connected with said yokes and adapted to be actuated thereby.

In testimony whereof I affix my signature in presence of two witnesses.

ANDREW WOOD.

Witnesses:
F. W. SMITH, Jr.,
M. T. LONGDEN.